(No Model.)
W. L. VELEY.
BAKE PAN.
No. 434,688. Patented Aug. 19, 1890.
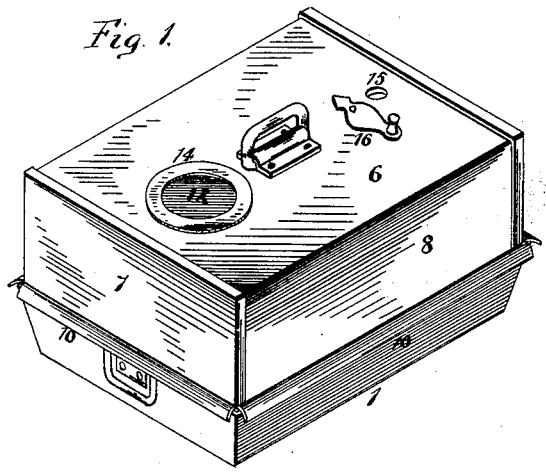
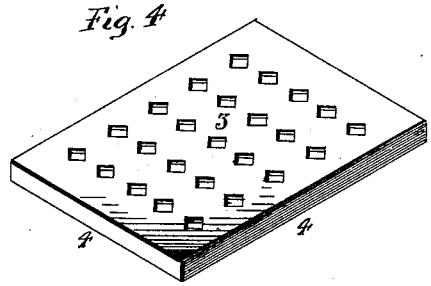
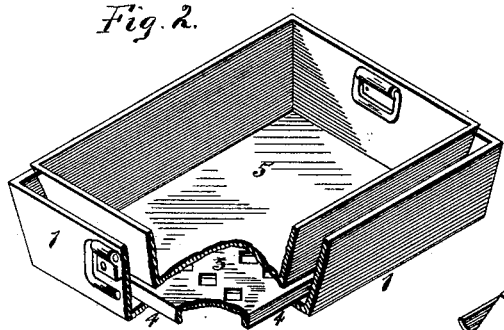
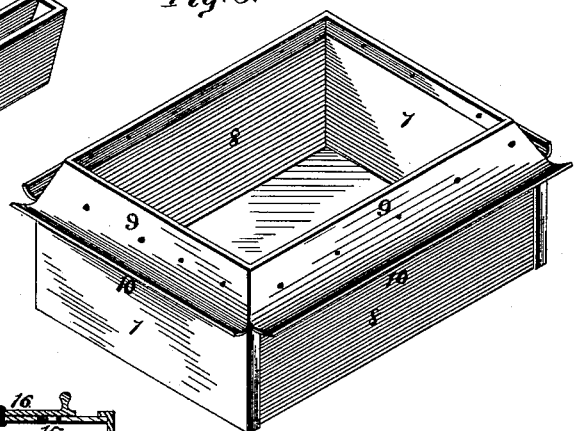
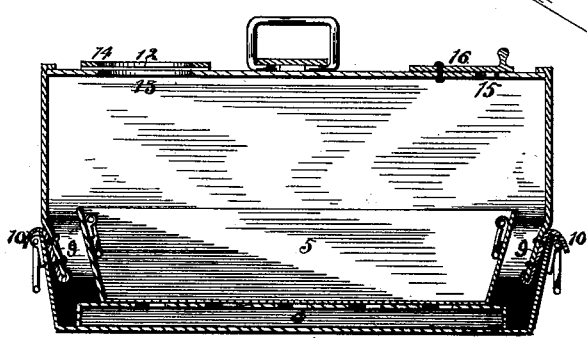
Witnesses:
L. L. Miller.
J. A. Southworth.
Inventor:
Willis L. Veley.
By A. O. Behel
Atty.

UNITED STATES PATENT OFFICE.

WILLIS L. VELEY, OF ROCHELLE, ILLINOIS.

BAKE-PAN.

SPECIFICATION forming part of Letters Patent No. 434,688, dated August 19, 1890.

Application filed March 7, 1890. Serial No. 342,954. (No model.)

*To all whom it may concern:*

Be it known that I, WILLIS L. VELEY, a citizen of the United States, residing at Rochelle, in the county of Ogle and State of Illinois, have invented certain new and useful Improvements in Bake-Pans, of which the following is a specification.

The object of this invention is to construct a bake-pan of two main sections—a receiving-pan and a perforated support for the receiving-pan.

In the accompanying drawings, Figure 1 is an isometrical representation of my bake-pan in position for use. Fig. 2 is an isometrical representation of the lower section of the pan with portions broken away to show the position of the parts. Fig. 3 is an isometrical representation of the under face and inside of the cover portion of the pan. Fig. 4 is an isometrical representation of the perforated support of the receiving-pan. Fig. 5 is a vertical lengthwise central section through the complete pan.

The lower pan 1 is of the usual construction of a dripping-pan which can be found on the market. Within this pan is placed a support consisting of a top plate 3 and depending sides and ends 4. The top plate is suitably perforated, as shown, for a purpose to appear hereinafter. This support is preferably made of sheet-iron and of a size to fit loosely within the pan. This perforated plate forms a support for a receiving-pan 5 of such dimensions that it can be placed inside of the pan 1. Within this pan is placed the food to be baked.

I have constructed a peculiar-shaped cover or upper section for the pans, which consists of a top 6, ends 7, and sides 8, secured together in any suitable manner. The lower edges 9 of the sides and ends are inclined inward, to which is riveted a flange 10, which has an outward downwardly-curving portion. When the cover is placed in position on the pan 1, the inclined walls of the cover will enter the pan and the cover will be supported over the pan by the flange resting on its upper edges. In the top of the cover is placed a disk 12 of isinglass or other transparent heat-resisting material, which is held in place over an opening 13 in the cover by a metallic washer 14 riveted in position, which permits an inspection of the food during the process of baking without removing the cover of the pan. A steam-escape opening 15 is also placed in the top of the cover, which can be closed by a pivotal plate 16.

When it is desired to roast meats or fowls, such meat or fowl is placed in the receiving-pan 5, which is placed on the perforated support in the pan 1. Water may be placed in the outside pan and the cover placed in position. Having the steam-escape opening closed, no further attention is required, as the water will become steam and penetrate the meat, making it juicy and tender, completely baking it in all its parts. By removing the plate from the opening 15 the steam will escape, allowing the meat to brown in the most satisfactory manner. In baking bread or cake the same process is carried out, except that it will not be necessary to place water in the lower pan.

By the employment of the perforated support the receiving-pan is raised some distance from the bottom of the outside pan, which prevents the burning of the food while being baked, and the perforations permit a uniform heat to the under side of the receiving-pan.

By having the inclined portion of the cover extending some distance within the lower pan the steam and heat will be less liable to escape from the pans than if the pans simply met, as in the construction now in use.

I claim as my invention—

In a bake-pan, the combination, with the pan-body, of its cover, the one provided with an inwardly-projecting edge to fit within the other and with a flange riveted to said edge and having one of its edges bent in hook form to serve as a support for said cover.

WILLIS L. VELEY.

Witnesses:
J. O. MCCONAUGHY,
GILBERT LANE.